O. BUCKLIN.
MANURE SPREADER.
APPLICATION FILED MAR. 26, 1920.
1,433,175.
Patented Oct. 24, 1922.
3 SHEETS—SHEET 3.
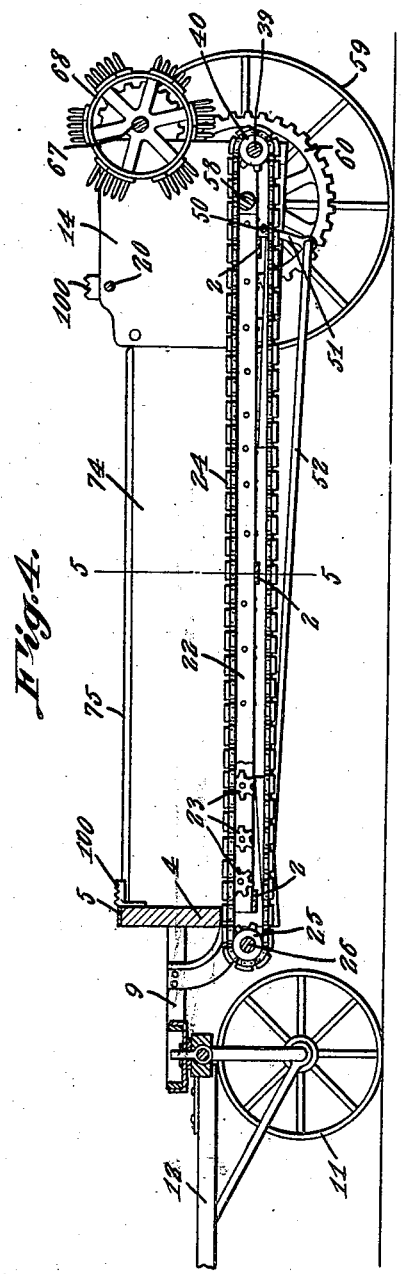
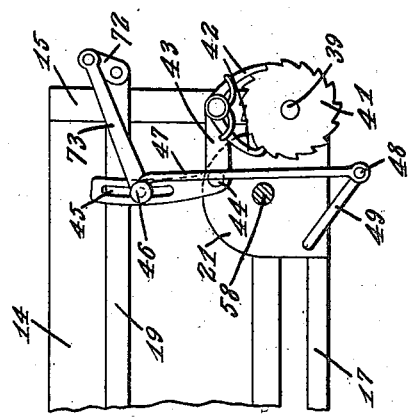
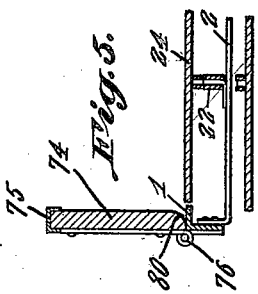

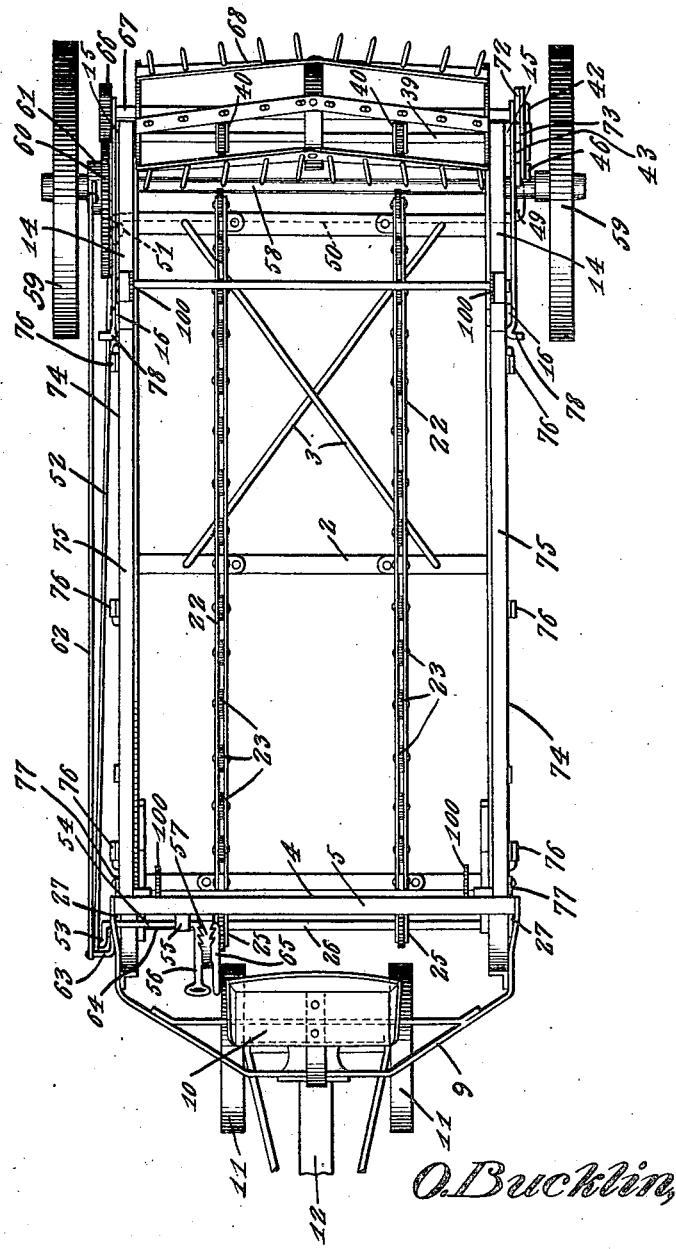

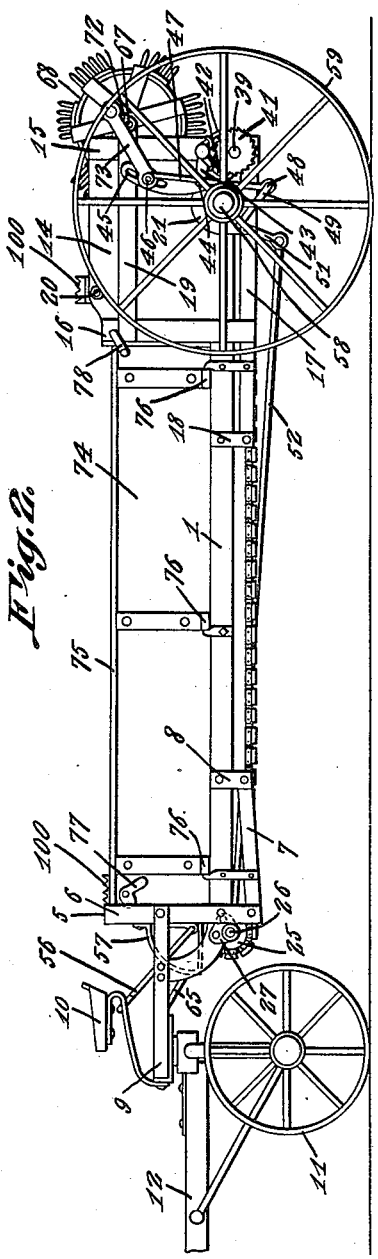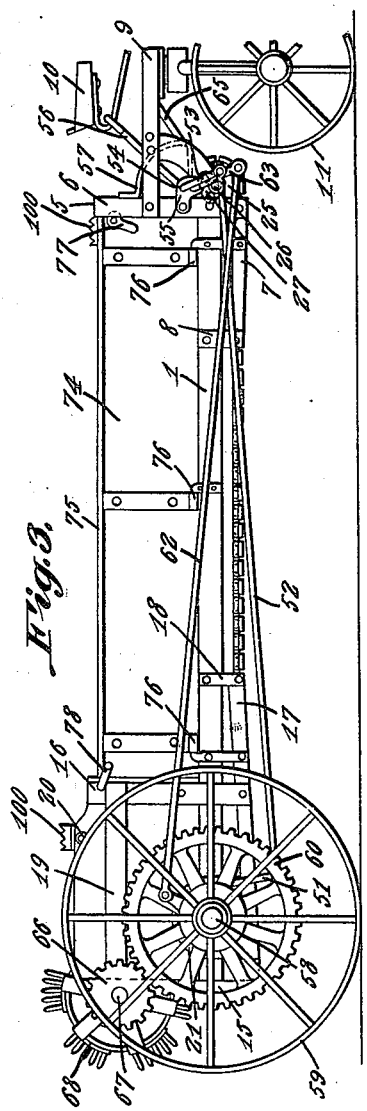

Patented Oct. 24, 1922.

1,433,175

UNITED STATES PATENT OFFICE.

ORSON BUCKLIN, OF MARIETTA, MINNESOTA.

MANURE SPREADER.

Application filed March 26, 1920. Serial No. 369,026.

*To all whom it may concern:*

Be it known that I, ORSON BUCKLIN, a citizen of the United States, residing at Marietta, in the county of Lac qui Parle and State of Minnesota, have invented a new and useful Manure Spreader, of which the following is a specification.

One object of the invention is to provide a device of the kind mentioned, having side walls, adapted to be swung downwardly, so that the manure or fertilizer can be thrown upon the apron portion of the machine without pitching the aforesaid material over the upper edges of the walls.

A further object of the invention is to provide means whereby, at the will of an operator, the apron may be advanced either through the action of a rotary spreader, or by hand.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention, the apron having been omitted; Figure 2 is a side elevation; Fig. 3 is an elevation wherein the opposite side from that depicted in Figure 2 is disclosed; Figure 4 is a longitudinal section wherein parts appear in elevation; Figure 5 is a fragmental section taken on the line 5—5 of Figure 4; and Figure 6 is a detail enlarged from Figure 2, parts having been omitted.

In carrying out the invention, there is provided a vehicle frame made up of longitudinal bars 1 connected by cross bars 2, certain of the bars 2 being united braces 3. An end wall 4 is mounted on the forward ends of the longitudinal bars 1 and carries a protecting top strip 5 extended downwardly to form end members 6, connected with the bars 1. Approximately horizontal bars 7 are connected to the lower ends of the members 6, and are united by hangers 8 with the longitudinal bars 1. The forward end of the vehicle comprises a frame work 9 of any desired kind, carrying a seat 10 and front wheels 11. The draft tongue is denoted by the numeral 12.

Mounted on the longitudinal bars 1, near to the rear ends thereof, are fixed side walls 14 connected with upright strips 15 and 16. The lower ends of the strips 15 and 16 are connected by bars 17, the forward ends of the said bars being united by hangers 18 with the longitudinal bars 1 of the frame. The upright strips 15 and 16 are connected, adjacent to their upper ends, by bearing bars 19 which project rearwardly beyond the rear edges of the fixed side walls 14, the walls 14 being connected by a tie rod 20. Bearing plates 21 are connected with the side bars 1 and with the bars 17.

The cross bars 2 carry tracks 22 on which are journaled wheels 23 of any desired sort, the wheels forming supports for an endless apron 24. The apron 24 at its forward end is engaged around sprocket wheels 25 on a shaft 26 journaled in bearings 27 carried by the forward portions of the bars 1. A shaft 39 is journaled for rotation in the lower ends of the strips 15. Sprocket wheels 40 are attached to the shaft 39, the apron 24 being engaged with the sprocket wheels. A ratchet wheel 41 is mounted on one end of the shaft 39 and is adapted to be actuated by pawls 42 pivoted to a bell crank lever 43 fulcrumed at 44 on one of the bearing plates 21. The upright arm of the bell crank lever 43 is provided with a curved slot 45 receiving a connection 46, the connection being carried by the upper end of an upright link 47 pivoted at its lower end as shown at 48, to a crank arm 49 on a shaft 50 journaled in the bearing plates 21. The opposite end of the shaft 50 carries a crank arm 51 pivoted to an operating rod 52. The forward end of the operating rod 52 is pivoted to a crank 53 on a shaft 54 journaled in bearings 55 on the end wall 4. The shaft 54 has a lever 56 adapted to coact with a segment 57 on the end wall 4, it being possible to spring the lever 56 out of engagement with the segment 67 and to operate the lever, for a purpose to be set forth hereinafter, should occasion require.

A main axle 58 is journaled for rotation in the rear ends of the bars 1 and in the bearing plates 21. The axle 58 carries ground wheels 59. A gear wheel 60 is loose on the axle 58, but is adapted to be connected thereto by means of a clutch 61 connected with a rod 62, the rod being pivoted to a crank 63 on a shaft 64 mounted to rock on the end wall 4 and carrying a lever 65 which may be made to coact with the segment 57 hereinbefore described.

A pinion 66 meshes into the gear wheel 60 and is mounted on a shaft 67 journaled in the projecting rear portions of the bars 19. The shaft 67 carries a rotary spreader 68 which need not be described in detail, because it forms the subject matter of my prior patent above alluded to. A crank arm 72 is secured to one end of the shaft 67 and is pivoted to a link 73, the forward end of which is pivotally mounted on the connection 46 which is located in the slot 45 of the upright arm of the bell crank 43.

The invention comprises side walls 74 adapted to be alined with the fixed side walls 14 and connected with the bars 1, 7 and 17 by means of hinges 76. The upper edges of the side walls may be bound with channel irons as shown at 75, to prevent the walls from warping. The lower ends of the movable side walls 74 are beveled off, as shown at 80 in Figure 5, to prevent the material in the vehicle from being jammed or bound when the side walls 74 are swung upwardly on the hinges 76, since such a contingency would prevent the side walls from swinging upwardly into alinement with the fixed side walls 14. The movable side walls 74 may be supplied with latches 77 cooperating with the end members 6, and the upright strips 16 may carry latches 78 to aid in holding the side walls 74 in upright positions. Dung fork cleaners 100 may be mounted on the machine in any desired positions.

When the latches 76 and 77 are moved into unlocked position, the movable side walls 74 may be swung downwardly on the hinges 76, it thus being possible to pitch the manure or fertilizer directly upon the movable apron 24, without hoisting the material over the upper edges of the side walls. It will be obvious that owing to this construction, the vehicle may be loaded with manure at a minimum expenditure of effort.

In practical operation, when the vehicle moves over the surface of the ground, the wheels 59 rotate the axle 58. If it is desired to operate the vehicle as a spreader, then the gear wheel 60 is coupled with the axle 58 by means of the clutch 61, the rod 62 being operated through the medium of the lever 65. Thus, when the ground wheels 59 and the axle 58 are rotated, the gear wheel 60 will rotate also. The gear wheel 60 drives the pinion 66 and the latter rotates the shaft 67 and the spreader 68. When the shaft 67 is rotated, the crank arm 72 will actuate the link 73, the link 73 tilting the bell crank lever 43 on its fulcrum 44, the pawls 42 rotating the shaft 39 by way of the ratchet wheel 41. In this way, the upper run of the endless apron 24 will move rearwardly, and manure on the apron will be advanced within the reach of the rotary member 68.

It is possible to actuate the apron 24 by hand, and this may be done by oscillating the lever 56, the shaft 54 operating the crank 53, and the crank rocking the shaft 50 by way of the rod 52 and the crank 51. The crank 49 on the shaft 50 will cause an elevation and a depression of the link 47, the connection 46 riding in the slot 15 of the bell crank lever 43 and causing the pawls 42 to drive the shaft 39 by means of the ratchet wheel 51.

Having thus described the invention, what is claimed is:—

In a device for converting motion, a frame; a shaft journaled on the frame and having a crank; a ratchet wheel journaled on the frame and located directly beneath the shaft; a bell crank lever fulcrumed on the frame in spaced relation to the ratchet wheel and comprising a first arm extended between the shaft and the ratchet wheel, and a second arm projecting away from the ratchet wheel; a thrust pawl and a pull pivoted to the first arm of the bell crank lever and cooperating with the ratchet wheel; a second crank mounted to swing on the frame; a link pivoted to the second crank, the link extending transversely of the first arm of the bell crank lever and longitudinally of the second arm thereof; a link pivoted to the first specified crank; and means for connecting both links together, and for mounting them for sliding adjustment on the second arm of the bell crank lever.

In testimony that I claim the foregoing as my own, I have hereto affixed my signature in the presence of two witnesses.

ORSON BUCKLIN.

Witnesses:
JOHN A. JOHNSON,
A. C. MILLER.